(12) United States Patent
Li

(10) Patent No.: US 10,764,218 B2
(45) Date of Patent: Sep. 1, 2020

(54) TREE-TYPE HOMEPAGE SYSTEM AND HOMEPAGE MANAGEMENT METHOD

(71) Applicant: Shiwei Li, Shatin (HK)

(72) Inventor: Shiwei Li, Shatin (HK)

(*) Notice: Subject to any disclaimer, the term of this patent is extended or adjusted under 35 U.S.C. 154(b) by 77 days.

(21) Appl. No.: 16/137,908

(22) Filed: Sep. 21, 2018

(65) Prior Publication Data
US 2019/0325037 A1    Oct. 24, 2019

Related U.S. Application Data

(60) Provisional application No. 62/659,297, filed on Apr. 18, 2018, provisional application No. 62/659,274, (Continued)

(30) Foreign Application Priority Data

Jun. 13, 2018  (CN) .......................... 2018 1 0608658
Jun. 13, 2018  (CN) .......................... 2018 1 0608659
(Continued)

(51) Int. Cl.
*G06F 17/00*   (2019.01)
*H04L 12/58*   (2006.01)
(Continued)

(52) U.S. Cl.
CPC .......... *H04L 51/046* (2013.01); *G06F 3/0481* (2013.01); *G06F 3/0483* (2013.01); (Continued)

(58) Field of Classification Search
CPC .. G06F 16/287; G06F 16/288; G06F 16/9024; G06F 17/2241; G06F 16/958; G06Q 50/01; G06T 11/206; G06T 2200/24
See application file for complete search history.

(56) References Cited

U.S. PATENT DOCUMENTS

2005/0027728 A1* 2/2005 O'Neil .................... G06F 16/86
2008/0300952 A1* 12/2008 Couper .................. G06Q 10/06
                                                                                           705/7.13
(Continued)

*Primary Examiner* — Andrew T McIntosh
(74) *Attorney, Agent, or Firm* — Locke Lord LLP; Tim Tingkang Xia, Esq.

(57) ABSTRACT

The invention relates to a tree-type homepage system and a homepage management method. The tree-type homepage system includes a plurality of homepages connected according to the organization internal administrative management relationship or personnel internal relationship. Each of the homepages has at least one identification number with a preset length, and is used to implement a management operation on a subordinate homepage belonging to it. Each of the identification numbers is used to identify homepage information corresponding thereto and communication between the homepage and a target homepage. The existing organization internal relationship or administrative management relationship is mapped based on the tree-type homepage system to implement management on the internal organization and personnel, so that the management efficiency on the organization internal personnel or organization branches can be greatly improved, and the management process is more convenient, precise and human-based.

20 Claims, 10 Drawing Sheets

Related U.S. Application Data filed on Apr. 18, 2018, provisional application No. 62/659,289, filed on Apr. 18, 2018, provisional application No. 62/659,285, filed on Apr. 18, 2018, provisional application No. 62/659,279, filed on Apr. 18, 2018, provisional application No. 62/659,268, filed on Apr. 18, 2018, provisional application No. 62/659,262, filed on Apr. 18, 2018, provisional application No. 62/659,292, filed on Apr. 18, 2018.

(30) Foreign Application Priority Data

| Jun. 13, 2018 | (CN) | 2018 1 0608671 |
|---|---|---|
| Jun. 13, 2018 | (CN) | 2018 1 0610187 |
| Jun. 13, 2018 | (CN) | 2018 1 0610189 |
| Jun. 13, 2018 | (CN) | 2018 1 0611025 |
| Jun. 13, 2018 | (CN) | 2018 1 0611056 |

(51) Int. Cl.

| G06F 3/0481 | (2013.01) |
|---|---|
| H04N 7/14 | (2006.01) |
| G06F 3/0484 | (2013.01) |
| G06F 16/22 | (2019.01) |
| G06F 16/9535 | (2019.01) |
| G06F 16/954 | (2019.01) |
| G06F 3/0483 | (2013.01) |
| G06F 16/958 | (2019.01) |
| G06F 16/901 | (2019.01) |
| G06F 21/31 | (2013.01) |
| G06F 21/44 | (2013.01) |
| G06F 16/248 | (2019.01) |
| G06Q 10/08 | (2012.01) |
| H04L 29/08 | (2006.01) |
| H04L 29/06 | (2006.01) |

(52) U.S. Cl.

CPC ...... *G06F 3/04817* (2013.01); *G06F 3/04845* (2013.01); *G06F 16/2246* (2019.01); *G06F 16/248* (2019.01); *G06F 16/9027* (2019.01); *G06F 16/954* (2019.01); *G06F 16/958* (2019.01); *G06F 16/9535* (2019.01); *G06F 21/31* (2013.01); *G06F 21/44* (2013.01); *G06Q 10/083* (2013.01); *H04L 51/04* (2013.01); *H04L 51/28* (2013.01); *H04L 51/32* (2013.01); *H04L 51/36* (2013.01); *H04L 67/02* (2013.01); *H04L 67/16* (2013.01); *H04N 7/141* (2013.01); *H04N 7/147* (2013.01); *G06F 2203/04803* (2013.01); *H04L 67/42* (2013.01)

(56) References Cited

U.S. PATENT DOCUMENTS

| 2010/0083374 | A1* | 4/2010 | Schmitlin | G06F 21/6218 726/21 |
|---|---|---|---|---|
| 2012/0304247 | A1* | 11/2012 | Badger | G06F 21/6218 726/1 |
| 2013/0198179 | A1* | 8/2013 | Arnott | G06Q 10/06 707/736 |

* cited by examiner

TREE-TYPE HOMEPAGE SYSTEM AND HOMEPAGE MANAGEMENT METHOD

CROSS-REFERENCE TO RELATED PATENT APPLICATIONS

This application claims priority to and the benefit of, pursuant to 35 U.S.C. § 119(e), U.S. Provisional Patent Application Nos. 62/659,262, 62/659,268, 62/659,274, 62/659,279, 62/659,285, 62/659,289, 62/659,292, and 62/659,297, all filed Apr. 18, 2018, which are incorporated herein in their entireties by reference.

This application also claims priority to and the benefit of, pursuant to 35 U.S.C. § 119(a), Chinese Patent Application Nos. 201810610187.5, 201810608659.3, 201810608671.4, 201810611056.9, 201810611025.3, 201810608658.9, and 201810610189.4, all filed Jun. 13, 2018, in the State Intellectual Property Office of P.R. China, which are incorporated herein in their entireties by reference.

FIELD OF THE INVENTION

The invention relates generally to the management of organizations, and more particularly to a tree-type homepage system and a homepage management method for the tree-type homepage system of an organization.

BACKGROUND OF THE INVENTION

The background description provided herein is for the purpose of generally presenting the context of the present invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

In the existing organization management system, effective management of various organization members cannot be achieved, especially when the size of the organization members is large, the adaptability and expansibility of the existing organization management systems are poor.

Therefore, a heretofore unaddressed need exists in the art to address the aforementioned deficiencies and inadequacies.

SUMMARY OF THE INVENTION

In view of the forgoing, the present invention provides a tree-type homepage system and a homepage management method, which can effectively solve the above problems.

In one aspect, the present invention provides a tree-type homepage system. The tree-type homepage system includes a plurality of homepages connected according to the organization internal administrative management relationship or personnel internal relationship. Each of the homepages has at least one identification number with a preset length, and is used to implement a management operation on a subordinate homepage belonging to it. Each of the identification numbers is used to identify homepage information corresponding thereto and communication between the homepage and a target homepage.

In one embodiment, the number of all the homepages in the tree-type homepage system is not greater than the value of the identification number of a root homepage in the tree-type homepage system, where one of the homepages has an identification number that is the smallest number of all the identification numbers owned by the homepage.

In another aspect, the present invention further provides a homepage management method used to implement management on the above tree-type homepage system. In one embodiment, the method includes responding to a homepage management instruction based on any of the homepages in the tree-type homepage system; determining an identification number of the current homepage according to the homepage management instruction, and determining identification numbers of all the subordinate homepages of the current homepage according to the identification number of the current homepage; and executing a management operation corresponding to the homepage management instruction on the current homepage and the subordinate homepages corresponding to the current homepage based on the identification number of the current homepage and the identification numbers of all the subordinate homepages of the current homepage.

In one embodiment, the management operation comprises a homepage movement, a homepage association, a homepage deletion, a homepage creation, a homepage authority setting, or a combination thereof.

In one embodiment, when the management operation is the homepage movement. The step of executing the management operation corresponding to the homepage management instruction on the current homepage and the subordinate homepages corresponding to the current homepage includes obtaining an identification number of a target movement homepage; moving the current homepage and/or the subordinate homepages corresponding to the current homepage to the target movement homepage as subordinate homepages of the target movement homepage based on the identification number of the current homepage and the identification numbers of all the subordinate homepages of the current homepage; and assigning a new identification number to the current homepage and/or the subordinate homepages corresponding to the current homepage according to the identification number of the target movement homepage.

In one embodiment, when the homepage management operation is the homepage association. The step of executing the management operation corresponding to the homepage management instruction on the current homepage and the subordinate homepages corresponding to the current homepage includes obtaining an identification number of a target association homepage; and associating the subordinate homepages corresponding to the current homepage to the target association homepage based on the identification number of the current homepage and the identification numbers of all the subordinate homepages of the current homepage such that the current homepage and the target homepage are used as common superior homepages of the subordinate homepages.

In one embodiment, when the management operation is the homepage authority setting. The step of executing the management operation corresponding to the homepage management instruction on the current homepage and the subordinate homepages corresponding to the current homepage includes identifying an authority setting type in a homepage authority setting instruction; selecting a target identification number that meets the requirement according to the authority setting information and the identification number of the current homepage; and performing authority association on the homepage corresponding to the target identification number and the current homepage.

In one embodiment, when the homepage management operation is the homepage creation. The step of executing the management operation corresponding to the homepage management instruction on the current homepage and the subordinate homepages corresponding to the current homepage includes responding to an identification number assignment type, the assignment type including manual assignment and system assignment; and when the assignment type is manual assignment, creating a subordinate homepage of the current homepage based on the current homepage, assigning an identification number segment input by a user based on the plurality of identification numbers owned by the current homepage to the newly created homepage, and using the smallest number in the identification number segment as the identification number of the newly created homepage; or when the assignment type is system assignment, creating a subordinate homepage of the current homepage based on the current homepage, and randomly assigning an identification number from the plurality of identification numbers owned by the current homepage as the identification number of the newly created homepage.

In one embodiment, the method further includes responding to a homepage communication instruction, the homepage communication instruction including one or more of an instant communication instruction, an audio and video call instruction, a mail sending and receiving instruction and an information release instruction; and establishing a communication link between the homepage corresponding to the identification number and the current homepage based on the identification number included in the homepage communication instruction to implement communication therebetween.

In one embodiment, the homepage management method further includes obtaining login information input by the user based on a page login interface; and jumping from the page login interface to the homepage corresponding to the identification number according to the identification number included in the login information, and displaying the homepage information.

In yet another aspect, the invention also provides a non-transitory computer-readable storage medium storing programs and/or instruction codes. The programs and/or instruction codes, when executed by one or more processors, cause the above homepage management method to be performed.

Compared with the prior art, the present invention provides a tree-type homepage system and a homepage management method, where the connection relationship between the homepages in the tree-type homepage system provided by the present invention corresponds to the existing organization internal relationship or administrative management relationship, and the homepage management method provided by the present invention implements the management operation on the tree-type homepage system based on identification numbers, so that the homepage information of the managed organization branches or personnel can be quickly located; and thus, the management efficiency on the organization internal personnel or organization branches can be greatly improved, and the management process is more convenient, precise and human-based.

To make the foregoing objectives, features and advantages of the present invention easier to understand, these and other aspects of the present invention will become apparent from the following description of the preferred embodiments, taken in conjunction with the following drawings, although variations and modifications therein may be affected without departing from the spirit and scope of the novel concepts of the disclosure.

BRIEF DESCRIPTION OF THE DRAWINGS

In order to more clearly illustrate the technical solutions of the embodiments of the present invention, the drawings used in the embodiments will be briefly described below. It should be understood that the following drawings show only certain embodiments of the present invention, and therefore, should not be considered as a limit to the scope, and those skilled in the art can obtain other related drawings according to these drawings without any creative work.

Figure 1:
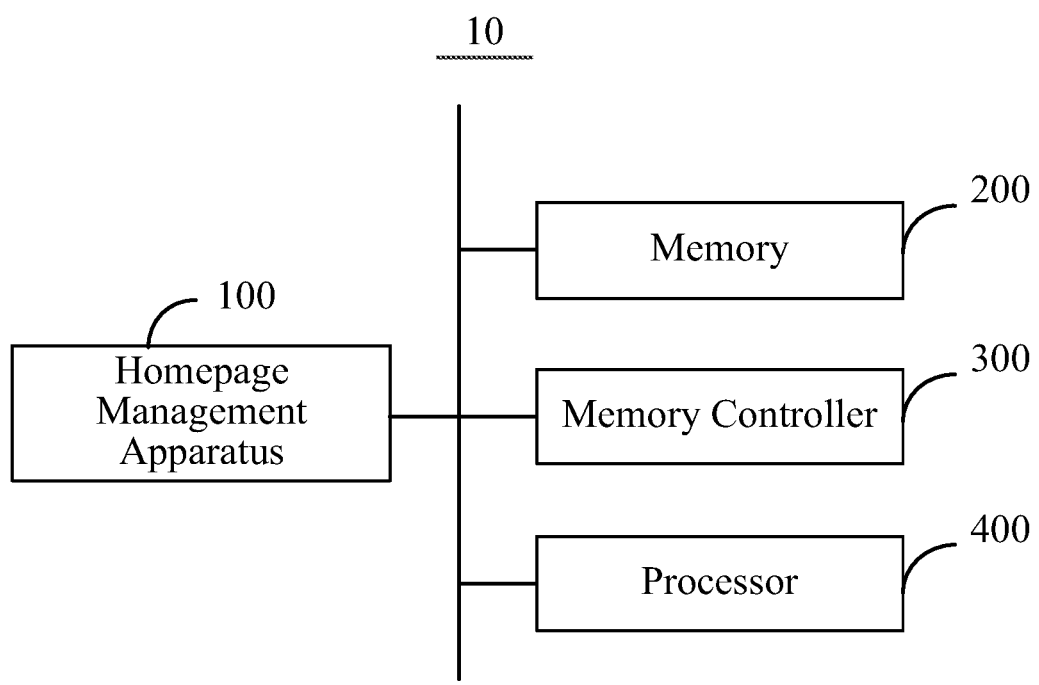
FIG. 1 is a structure block diagram of a homepage management platform of a tree-type homepage system according to one embodiment of the present invention.

Listing of reference numerals: 10, homepage management platform; 100, homepage management apparatus; 200, memory; 300, memory controller; and 400, processor.

DETAILED DESCRIPTION OF THE INVENTION

The invention will now be described more fully hereinafter with reference to the accompanying drawings, in which exemplary embodiments of the invention are shown. The invention may, however, be embodied in many different forms and should not be construed as limited to the embodiments set forth herein. Rather, these embodiments are provided so that this invention will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting and/or capital letters has no influence on the scope and meaning of a term; the scope and meaning of a term are the same, in the same context, whether or not it is highlighted and/or in capital letters. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only and in no way limits the scope and meaning of the invention or of any exemplified term. Likewise, the invention is not limited to various embodiments given in this specification.

The terminology used herein is for the purpose of describing particular embodiments only and is not intended to be limiting of the invention. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below can be termed a second element, component, region, layer or section without departing from the teachings of the invention.

Furthermore, relative terms, such as "lower" or "bottom" and "upper" or "top," may be used herein to describe one element's relationship to another element as illustrated in the figures. It will be understood that relative terms are intended to encompass different orientations of the device in addition to the orientation shown in the figures. For example, if the device in one of the figures is turned over, elements described as being on the "lower" side of other elements would then be oriented on the "upper" sides of the other elements. The exemplary term "lower" can, therefore, encompass both an orientation of lower and upper, depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

It will be further understood that the terms "comprise(s)" and/or "comprising," or "include(s)" and/or "including" or "has (have)" and/or "having" or "contain(s)" and/or "containing" when used in this specification specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which the invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

As used herein, the phrase at least one of A, B, and C should be construed to mean a logical (A or B or C), using a non-exclusive logical OR. As used herein, the term "and/or" includes any and all combinations of one or more of the associated listed items.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The terms "chip" or "computer chip", as used herein, generally refer to a hardware electronic component, and may refer to or include a small electronic circuit unit, also known as an integrated circuit (IC), or a combination of electronic circuits or ICs.

As used herein, the term "server" generally refers to a system (e.g., a social network server) that responds to requests across a computer network to provide, or help to provide, network services, e.g., network data storage and database management. A server may also include one or more processors to execute computer programs in parallel. An implementation of the server may include software and suitable computer hardware. A server may run on a computing device or a network computer. In some cases, a computer may provide several services and have multiple servers running.

The terms "client" or "client terminal", or "terminal", as used herein, refer to any appropriate user terminal with certain computing capabilities, e.g., a personal computer (PC), a work station computer, a hand-held computing device (e.g., a tablet), a mobile terminal (e.g., a mobile phone or a smart phone), or any other user-side computing devices.

The invention in one aspect relates to a tree-type homepage system and a homepage management method for the tree-type homepage system of an organization. One of ordinary skill in the art would appreciate that, unless otherwise indicated, certain computer systems and/or components thereof may be implemented in, but not limited to, the forms of software, firmware or hardware components, or a combination thereof.

The apparatuses, systems, and/or methods may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The apparatuses, systems, and/or methods may be illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The description below is merely illustrative in nature and is in no way intended to limit the invention, its application, or uses. The broad teachings of the invention can be implemented in a variety of forms. Therefore, while this invention includes particular examples, the true scope of the invention should not be so limited since other modifications will become apparent upon a study of the drawings, the specification, and the following claims. For purposes of clarity, the same reference numbers will be used in the drawings to identify similar elements. It should be understood that one or more steps within a method may be executed in different order (or concurrently) without altering the principles of the invention.

Homepages have been widely used as a showcase in social networks for individual and organization users to update posts, photos, videos and etc. They are rarely used to represent an administrative structure for organizational usage. In this regard, the inventor's research found that since a homepage can be used to represent a user, the organization is composed of multiple users and/or organization branches, regardless of how complex the organization is, the homepage can also be used to represent an organization or organization branch. Based on this, the present invention provides a tree-type homepage system based on homepage creation and a homepage management method for performing homepage management on the tree-type homepage system, wherein each homepage in the tree-type homepage system is used to represent an organization branch and/or person in the organization, the connection relationship between the homepages is used to map the administrative management relationship and personnel internal relationship (such as superior-subordinate subordination relationship, etc.) of an organization. In the meanwhile, each homepage in the tree-type homepage system corresponds to an identification number, so as to implement identification, management and the like on each homepage in the tree-type homepage system based on the identification number.

Referring to FIG. 1, a structure block diagram of a homepage management platform 10 using a tree-type homepage system and a homepage management method is shown according to one embodiments of the present invention. The homepage management platform 10 includes a homepage management apparatus 100, a memory 200, a memory controller 300 and a processor 400. The components of the memory 200, the memory controller 300 and the processor 400 are directly or indirectly electrically connected to each other to implement data transmission or interaction. For example, these components are electrically connected by one or more communication buses or signal lines. The homepage management apparatus 100 includes at least one software function module that can be stored in the memory 200 or solidified in an operating system in the homepage management platform 10 in the form of software or firmware. The processor 400 accesses the memory 200 under the control of the memory controller 300 for executing executable modules stored in the memory 200, for example, software function modules and computer programs included in the homepage management apparatus 100.

It should be understood that the structure shown in FIG. 1 is merely illustrative. The homepage management platform 10 may have more or fewer components than those shown in FIG. 1, or have a different configuration from that shown in FIG. 1. The components shown in FIG. 1 may be implemented by software, hardware, or a combination thereof. Optionally, the homepage management platform 10 may be, but not limited to, a server, a computer, a mobile phone, a tablet, an iPad, and the like.

Figure 2:
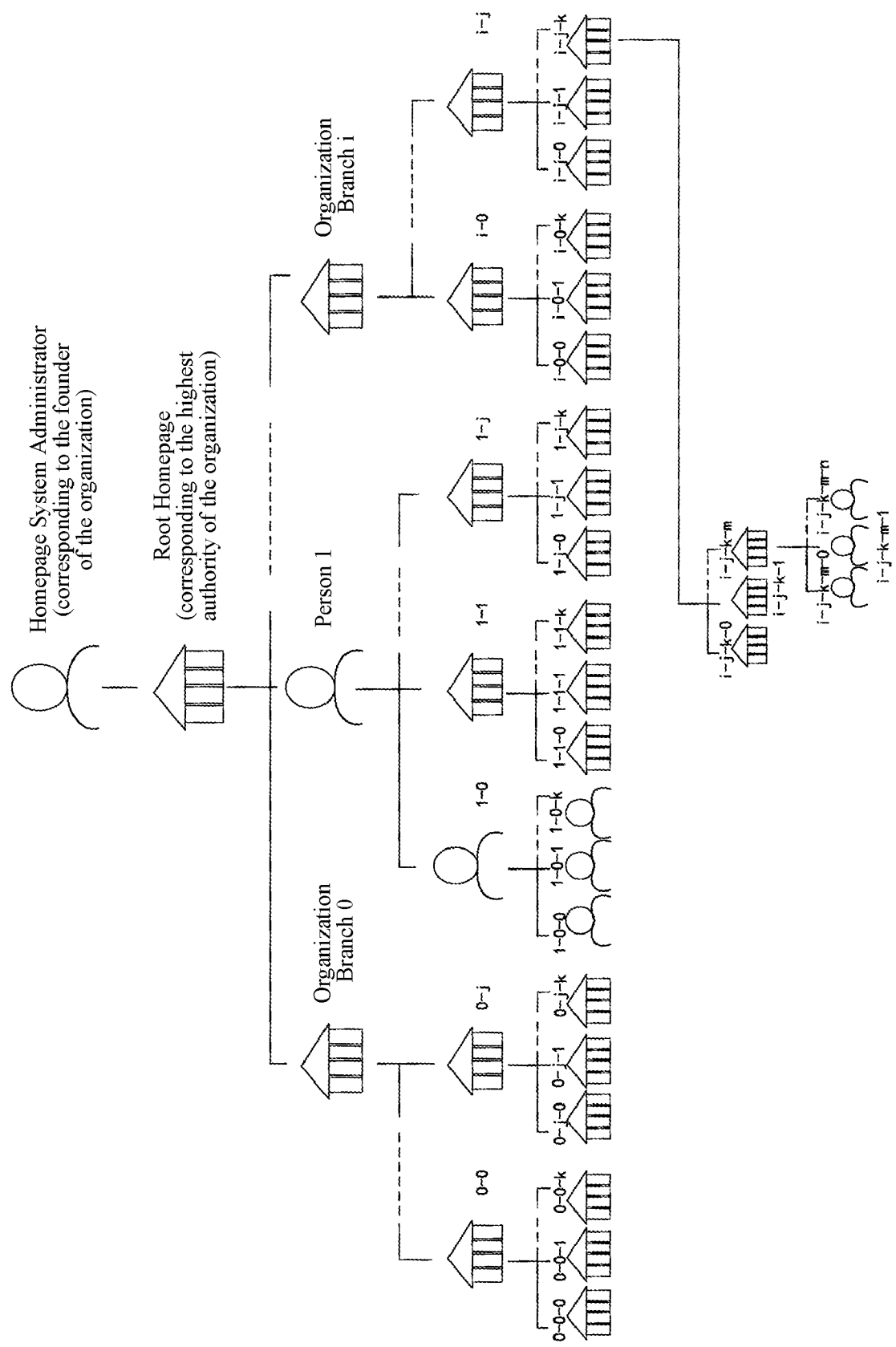
FIG. 2 is a structure diagram of a tree-type homepage system according to one embodiment of the present invention.

FIG. 2 is a structure diagram of a tree-type homepage system according to one embodiment of the present invention. The tree-type homepage system includes a plurality of homepages connected according to the organization internal administrative management relationship or personnel internal relationship, each of the homepages has at least one identification number with a preset length, each of the homepages is used to implement a management operation on a subordinate homepage belonging to it, and each of the identification numbers is used to identify and search corresponding homepage information or establish communication between the homepage and a target homepage. It can be understood that the letters i, j, k, m, n used to identify each level of the homepage in FIG. 2 are all nonnegative integers, and both types of icons shown in the drawing represent the homepages.

In the exemplary embodiment, the tree-type homepage system is a multi-level homepage connected/nested homepage set, which is used to map an organization branch or organization internal relationship, and the superior-subordinate connection relationship between the homepages at all levels depends on the administrative management relationship or internal relationship within the organization, and each of the homepages can be used to implement a management operation on a subordinate homepage belonging to it. It can be understood here that a root homepage (top-level homepage) in the above tree-type homepage system may correspond to an organization or a person who has the greatest management authority in the actual management of the organization. For example, the root homepage serves as the top-level homepage of the tree-type homepage system, and has the management operation authority to all other homepages in the tree-type homepage system, such as homepage movement, homepage association, homepage deletion, homepage creation, or homepage authority setting, etc. Further, corresponding to the administrative management relationship within the organization, any of the superior homepages in the tree-type homepage system has management operation authority to the subordinate homepage belonging thereto.

In addition, in the tree-type homepage system provided in the embodiment, the identification number is used to identify and search a homepage of any branch or person of an organization, and the operation of homepage information access, querying, new homepage creation, and communication between the homepages on the homepage may be performed based on the identification number with the preset length. The actual design form and length of the identification number may be flexibly designed according to actual needs. For example, the length (preset length) of the identification number may be an integer greater than or equal to 4, so as to facilitate the extension of the personnel and branches in the organization, as in the present embodiment, the length of the identification number is preferably 12 digits or the like. In addition, the identification number may be in the form of a fixed number plus a variable number. If the identification number is a 12-digit number, the 12-digit identification number may be in the form of 4000xxxxxxxx, where 4000 is fixed and x is an integer ranging from 0 to 9, and then when the tree-type homepage system is created based on this form of identification number, for an organization branch and an organization with less than 10000 persons, the 12-digit number section assigned to the tree-type homepage system of the organization has a form of 4000 abcd xxxx, where abcd is a constant.

Furthermore, since each homepage in the tree-type homepage system is created based on the identification number, the number of all the homepages in the tree-type homepage system is not greater than the value of the identification number of the root homepage in the tree-type homepage system, and for a homepage with multiple identification numbers, the identification number of the homepage is the smallest number of all the identification numbers owned by the homepage. As shown in FIG. 2, if the identification number is a 12-digit number and the root homepage of the tree-type homepage system can have an identification number of 4000 1000 0000~0999, 2000~2999, 6000~6999, then the identification number of the root homepage is 4000 1000 0000.

Figure 3:
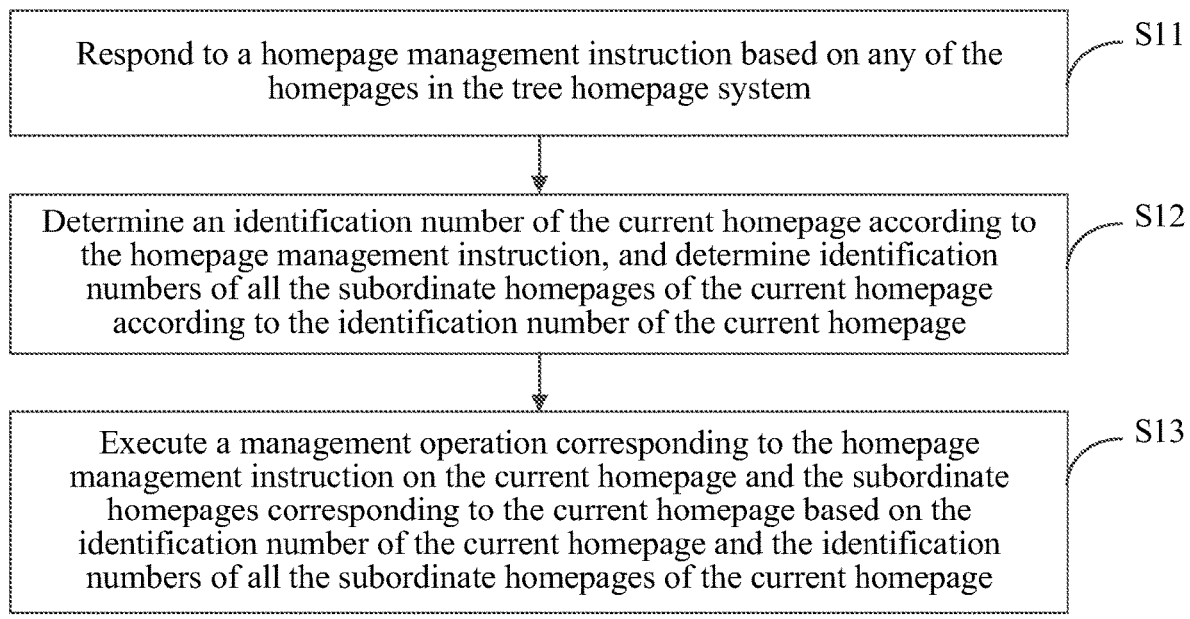
FIG. 3 is a flow diagram of a homepage management method according to one embodiment of the present invention.

Moreover, based on the description of the tree-type homepage system, the embodiment of the present invention further provides a homepage management method applied to the homepage management platform 10, where the homepage management method is used to implement management on each homepage in the tree-type homepage system. The specific flow and steps of the homepage management method will be described in detail below with reference to FIG. 3. It should be noted that the method is not limited to the specific order shown in FIG. 3.

Step S11: responding to a homepage management instruction based on any of the homepages in the tree-type homepage system;

Step S12: determining an identification number of the current homepage according to the homepage management instruction, and determining identification numbers of all the subordinate homepages of the current homepage according to the identification number of the current homepage; and Step S13: executing a management operation corresponding to the homepage management instruction on the current homepage and the subordinate homepages corresponding to the current homepage based on the identification number of the current homepage and the identification numbers of all the subordinate homepages of the current homepage.

According to the above steps S11 to S13, the present invention can perform a management operation on a person or an organization branch based on a tree-type homepage system corresponding to the existing actual organization internal relationship or administrative management relationship with respect to the existing organization management mode, so that in the process of managing branches or personnel within the organization, it is possible to quickly locate and operate the homepage of the managed organization branch or person, so that the management efficiency is greatly improved, and the management process is more convenient, precise and human-based, for example, based on the identification number, the management operation of creating, moving and associating the subordinate homepage by the superior homepage is implemented.

Figure 4:
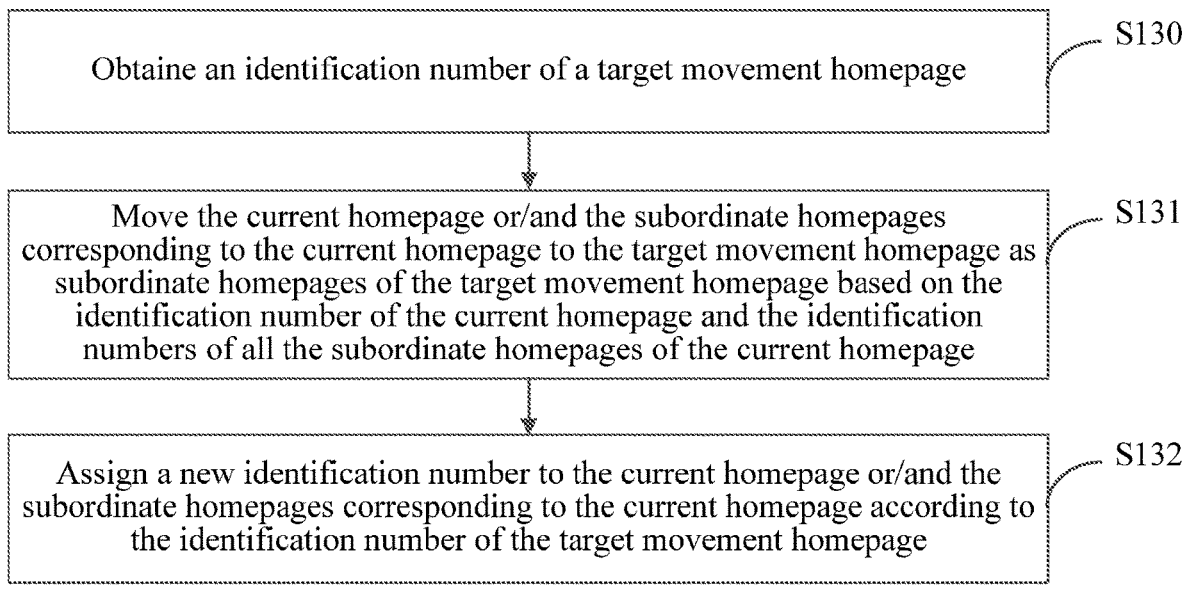
FIG. 4 is a sub-flow diagram of step S13 shown in FIG. 3.

Specifically, in step S11, the homepage management instruction is initiated by the user based on a display interface of the homepage. In addition, as shown in FIG. 4, before the step S11 is performed in the present embodiment, the homepage management method may further include the following steps S14 and S15.

Step S14: obtaining login information input by the user based on a page login interface; and Step S15: jumping from the page login interface to the homepage corresponding to the identification number according to the identification number included in the login information, and displaying the homepage information.

According to steps S14 and S15, for any homepage in the tree-type homepage system, the identification number can be used as a digital ID for homepage login, for example, for an organization, the user can log in as the user of the organization and enter the homepage of the organization by inputting the identification number on the login interface. In addition, in actual implementation, the login information may include, but is not limited to, an identification number. For example, in order to further improve the security of the user homepage login process, a login password may be added on the basis of the identification number to provide a double guarantee for the homepage login security. Optionally, after the user logs in the homepage, the identification number corresponding to the homepage can be viewed at the account name in the homepage.

Further, in step S12, in the tree-type homepage system, the current homepage may include multiple levels of subordinate homepages or may not include any subordinate homepage, each homepage corresponds to at least one identification number, and the identification numbers have a superior-subordinate subordination relationship; and therefore, in the present embodiment, when the current homepage or all the subordinate homepages of the current homepage are operated, the corresponding homepage information may be searched according to the subordination relationship between the identification numbers.

In addition, on the basis of the above steps S11 and S12, in step S13, for any homepage in the tree-type homepage system, the management operation may include, but not limited to, one or more of homepage movement, homepage association, homepage deletion, homepage creation or the homepage authority setting. It can be understood that the management authority of each current homepage to the subordinate homepage can be flexibly defined according to actual needs.

In actual implementation, the user can click the "Manage Homepage" tab in the "Settings" drop-down menu on the current homepage to enter the "Homepage Management" page, select the homepage to be managed on the "Homepage Management" page, click the "Manage" button below the homepage name to enter the "Management" page, and perform settings such as homepage movement, homepage association, homepage deletion, homepage creation or homepage authority setting, password setting, Gcall number assignment, and message notification on the subordinate homepage. The management operations described in the present embodiment are briefly introduced by taking the homepage movement, homepage association, homepage creation and the homepage authority setting as examples.

Figure 5:
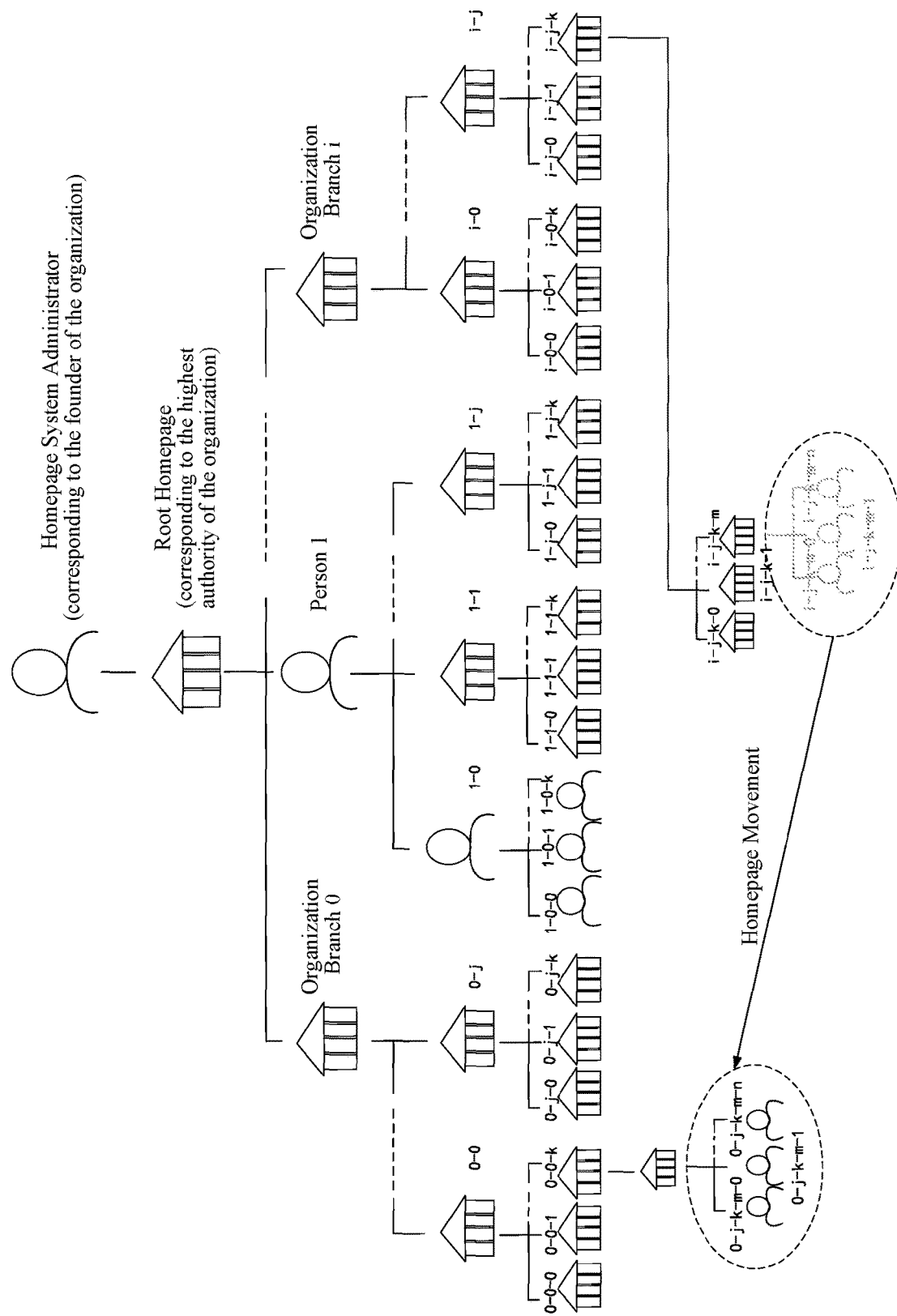
FIG. 5 is a diagram of a homepage movement process shown in FIG. 4.

(1) When the management operation is the homepage movement, as shown in FIG. 5, the step of executing the management operation corresponding to the homepage management instruction on the current homepage and the subordinate homepages corresponding to the current homepage includes:

Step S130: obtaining an identification number of a target movement homepage;

Step S131: moving the current homepage and/or the subordinate homepages corresponding to the current homepage to the target movement homepage as subordinate homepages of the target movement homepage based on the identification number of the current homepage and the identification numbers of all the subordinate homepages of the current homepage; and Step S132: assigning a new identification number to the current homepage and/or the subordinate homepages corresponding to the current homepage according to the identification number of the target movement homepage.

Figure 6:
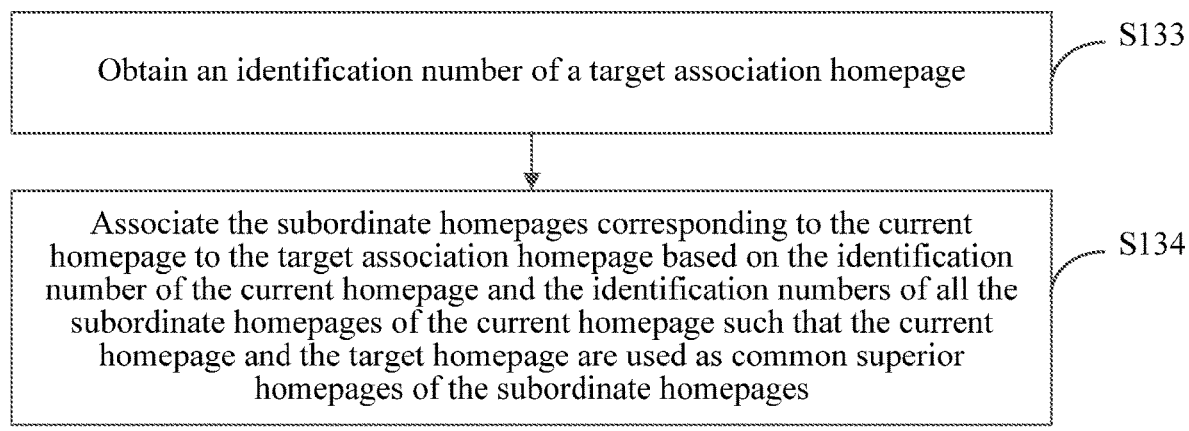
FIG. 6 is another sub-flow diagram of step S13 shown in FIG. 3.

According to step S130 to step S132, as shown in FIG. 6, when the homepage movement is performed, moving a set of homepages is defined as equivalent to firstly deleting the set of homepages under the original superior homepage of the current homepage and recreating the same set of homepages including the same information as the deleted homepages under the target movement homepage. However, it should be noted that after moving the current homepage and/or the subordinate homepage corresponding to the current homepage to the target movement homepage, the identification number of the current homepage and/or the subordinate homepage corresponding to the current homepage need to be redefined according to the identification number owned by the target homepage.

For example, in an embodiment, in the case that the "Sales Manager" under the "A Region Sales Director" homepage (current homepage) is moved to the "B Region Sales Director" homepage (target movement homepage), after the movement operation is completed, the "B Region Sales Director" becomes the only superior homepage of the "Sales Manager" homepage and subordinate homepages thereof, and has all the management authorities, and the "Sales Manager" homepage is displayed in all tree structure diagrams of "B Region Sales".

Figure 7:
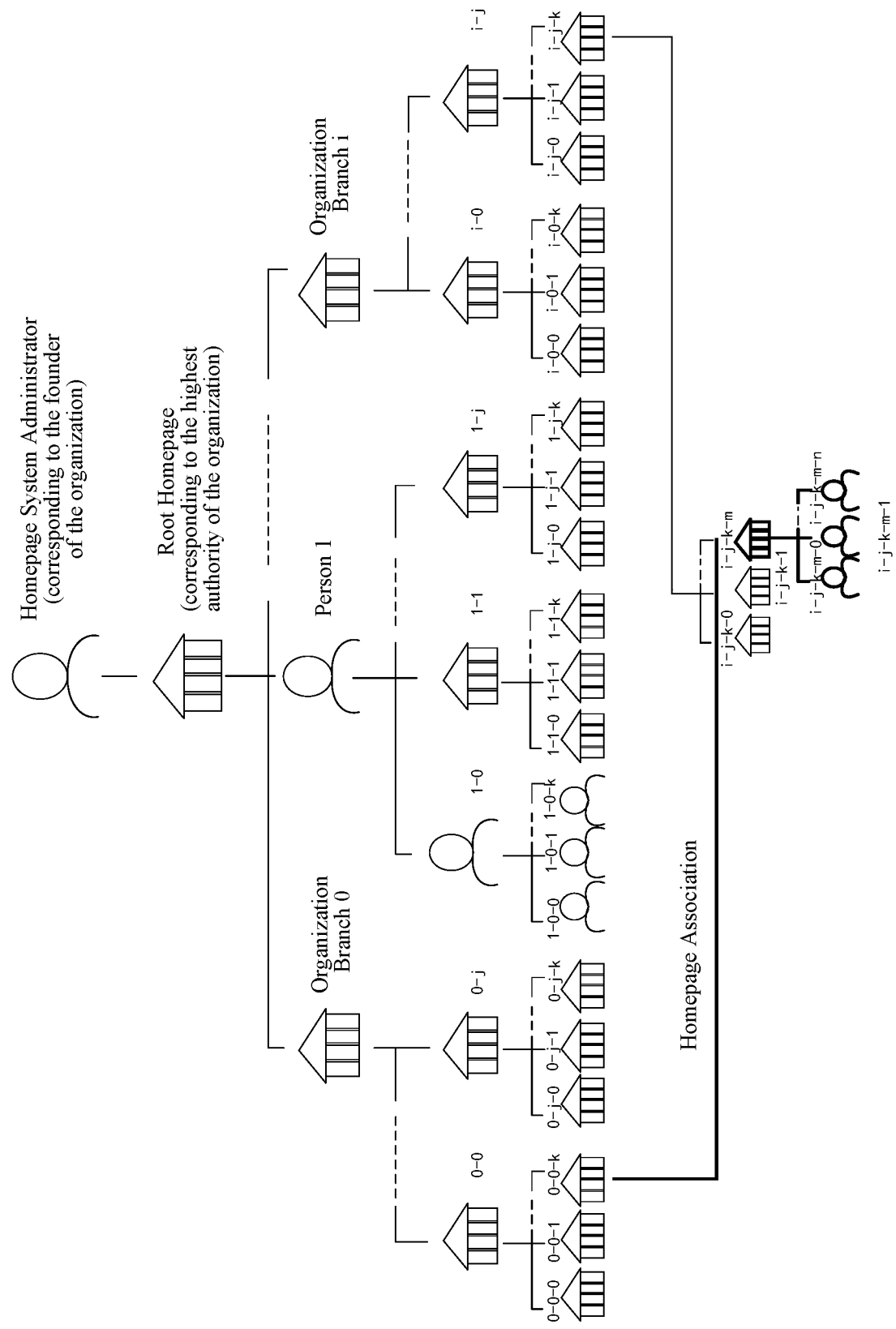
FIG. 7 is a diagram of a homepage association process shown in FIG. 6.

(2) When the homepage management operation is the homepage association, as shown in FIG. 7, the step of executing the management operation corresponding to the homepage management instruction on the current homepage and the subordinate homepages corresponding to the current homepage includes:

Step S133: obtaining an identification number of a target association homepage; and Step S134: associating the subordinate homepages corresponding to the current homepage to the target association homepage based on the identification number of the current homepage and the identification numbers of all the subordinate homepages of the current homepage such that the current homepage and the target homepage are used as common superior homepages of the subordinate homepages.

Figure 8:
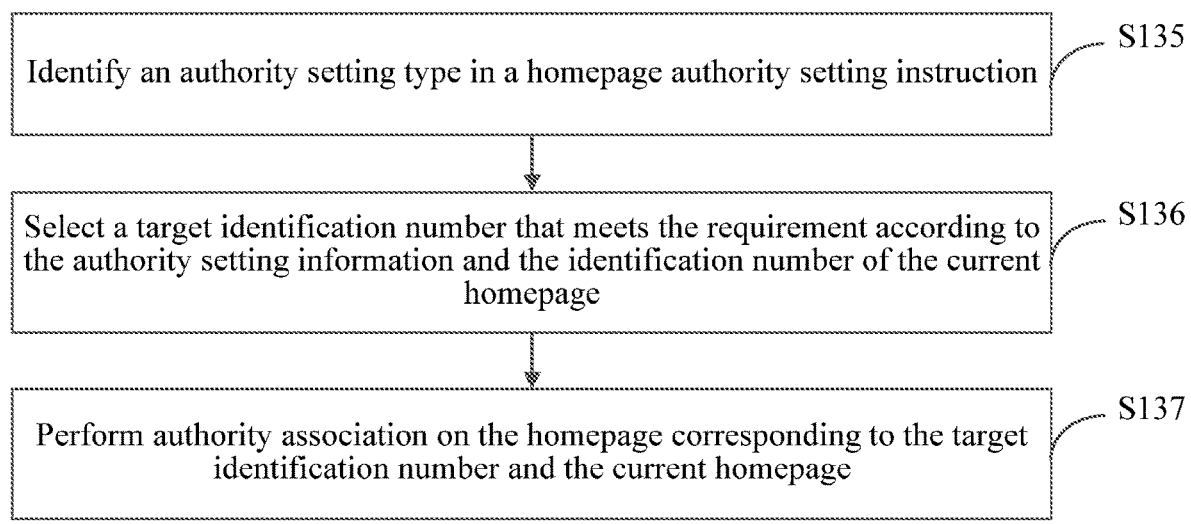
FIG. 8 is another sub-flow diagram of step S13 shown in FIG. 3.

According to step S133 to step S134, as shown in FIG. 8, the process of associating the current homepage (a homepage) or all the subordinate homepages (a set of homepages) of the current homepage to a target association homepage is defined as granting all management authorities to the new target association homepage, but the association operation does not transfer the management authority of the original superior homepage of the associated homepage, and does not generate a new management path through the newly associated immediate superior homepage to the top-level homepage. However, this operation may generate a set of higher-level homepages with management authorities associated with the connected lower-level homepage or homepage set.

For example, in an embodiment, in the case that the "Sales Manager" under the "A Region Sales Director" homepage (current homepage) is associated to under the "B Region Sales Director" homepage (target association homepage), after the association operation is completed, the "A Region Sales Director" and "B Region Sales Director" become the common superior homepages of the "Sales Manager" homepage and subordinate homepages thereof; and the "Sales Manager" homepage is displayed in all tree-structure diagrams of "B Region Sales" and "A Region Sales", but the superior homepage of the "B Region Sales Director" does not have all the management authorities of the "Sales Manager" homepage.

(3) When the homepage management operation is the homepage creation, the step of executing the management operation corresponding to the homepage management instruction on the current homepage and the subordinate homepages corresponding to the current homepage includes: responding to an identification number assignment type, the assignment type including manual assignment and system assignment; when the assignment type is manual assignment, creating a subordinate homepage of the current homepage based on the current homepage, assigning an identification number segment input by a user based on the plurality of identification numbers owned by the current homepage to the newly created homepage, and using the smallest number in the identification number segment as the identification number of the newly created homepage; or when the assignment type is system assignment, creating a subordinate homepage of the current homepage based on the current homepage, and randomly assigning an identification number from the plurality of identification numbers owned by the current homepage as the identification number of the newly created homepage.

Specifically, each of the homepages in the tree-type homepage system in the homepage creation process described above has the next-level homepage belonging to it as the subordinate homepage of the root homepage. Wherein since the relationship between the homepages in the tree-type homepage system corresponds to the actual management relationship within the organization, when the homepage is created, it is possible to select which homepage to create the next-level homepage. For example, the user can choose the homepage of "Finance Department" to create the next-level homepage "Cashier-Accounting", and after the homepage is created successfully, the "Cashier-Accounting" homepage belongs to the "Finance Department" homepage and is displayed as the next-level homepage of the Finance Department homepage tree diagram; for another example, select "Post" to create a homepage of the organization-like type, having tags for contacts, groups, activities, blogs, etc.; and for another example, select "Department" to create a homepage of the organization-like type, having the tags for recruitment, products, purchase, investment, etc.

Further, according to actual needs, for a homepage having a homepage creation authority in the tree-type homepage system, the maximum number of subordinate homepages that can be created is equal to the number of the identification numbers owned by the homepage. For example, the identification number of the current homepage is the smallest number in the identification numbers it owns, that is, if a current homepage has M identification numbers, the current homepage can create up to M–1 subordinate homepages. In addition, in the process of creating the homepage, it is possible to use an organization-like or individual-like template to create a page that represents the branch or person, the organization-like template including tags of recruitment, products, purchase, investment and other types, and the individual-like template including tags of contacts, groups, activities, blogs and other types.

In addition, since each homepage corresponds to an identification number, in the present embodiment, the process of assigning the identification number when the homepage is newly created includes manual assignment and system assignment. For example, in actual implementation, click the type of the homepage you want to create, input the homepage name, select the homepage field and category and click the "Create" button, and then the page pop-up window prompts to set the login password and the Gcall number (identification number) assignment type, wherein the user can select manual assignment or system assignment based on the Gcall number assignment type. The following describes the two identification number assignment modes: manual assignment or system assignment.

Manual assignment: if the user selects manual assignment, an identification number or an identification number segment can be assigned to the homepage based on the identification number of the current homepage. For example, if the identification number is a 12-digit number starting with 4000, the user can assign the newly created homepage with the number segment starting with 4000 of which the first eight digits are the same as the first eight digits of the 12-digit number of the current homepage; and when multiple 12-digit number segments, such as 400000177800-400000177900, are assigned to a homepage, 400000177800 can be assigned to the newly created homepage as the 12-digit number of the newly created homepage.

System assignment: one identification number can be assigned by the tree-type homepage system as the identification number of the newly created homepage. Wherein if "System Assignment" is selected, the created subordinate homepage has no other identification number except the one identification number owned by itself, and then the newly created subordinate homepage does not have the authority to create a subordinate homepage that belongs to itself. In other words, only after the superior homepage manually assigns the created homepage with more than one identification numbers, the newly created homepage has the authority to create a homepage belonging to its subordinate homepage.

It should be noted that the assignment rule in the above two identification number assignment types is: when the current homepage creates its subordinate homepage, by default, the smallest identification number in the multiple identification numbers owned by the homepage other than the one identification number occupied by the created homepage and identification numbers that have been assigned to other subordinate homepages is used as the identification number of the newly created homepage. In addition, according to actual needs, whether the identification number of the newly created homepage is based on manual assignment or system assignment, the superior homepage of the newly created homepage or the newly created homepage itself may modify the identification number thereon, but the modified identification number must be an unassigned (unused) identification number of its superior homepage or an unassigned (unused) identification number owned by itself.

Figure 9:
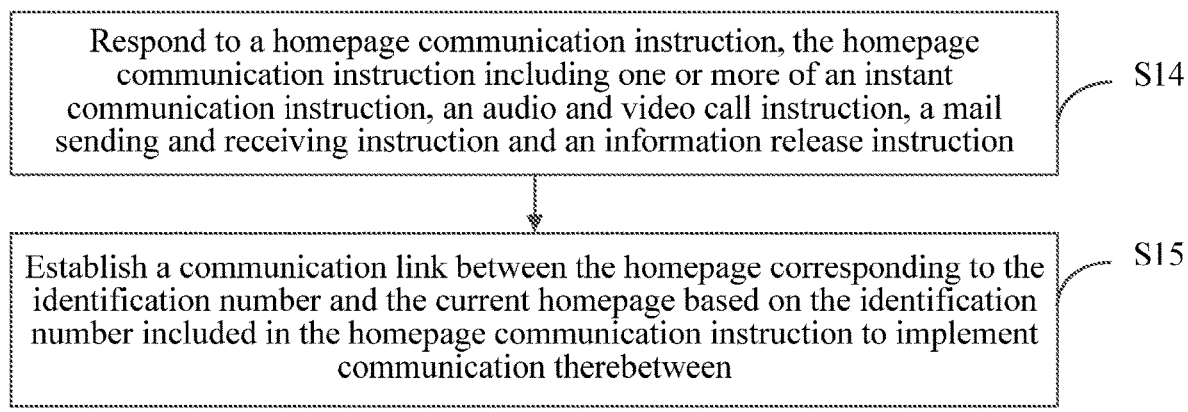
FIG. 9 is a flow diagram of a homepage management method according to another embodiment of the present invention.

(4) When the management operation is the homepage authority setting, as shown in FIG. 9, the step of executing the management operation corresponding to the homepage management instruction on the current homepage and the subordinate homepages corresponding to the current homepage includes:

Step S135: identifying an authority setting type in a homepage authority setting instruction;

Step S136: selecting a target identification number that meets the requirement according to the authority setting information and the identification number of the current homepage; and Step S137: performing authority association on the homepage corresponding to the target identification number and the current homepage.

Specifically, in step S135 to step S137, the authority setting type may include, but not limited to, one or more of homepage information access authority setting, homepage visibility setting, communication mode visibility setting and management authority setting. The following is a brief description of the different authority setting types.

(a) For the management authority setting, for any homepage in the tree-type homepage system, the management operation authority of the superior homepage to the subordinate homepage, such as homepage movement, homepage association, homepage creation, etc., can be set.

(b) For the homepage visibility setting, the visibility setting range can generally be divided into five levels: public, in-organization, all subordinate homepages, direct subordinate homepages and itself. For example, the visibility of the current homepage may be set to be visible only to the superior homepage, only visible to the peer homepage, only visible to the subordinate homepage, or visible (invisible) to all homepages in the homepage system.

(c) For the homepage information access authority setting, whether a visitor has the authority to view the homepage of the organization or the homepages within the organization depends on the visibility setting range of the homepage, and if the homepage visibility of the homepage is set to be public, the homepage is visible to the whole network. Assuming that the homepage visibility of the "A Person" is set as "visible to partial homepages in the organization, then the homepage information of the "A Person" can be accessed by all superior homepages connected in the root homepage path and peer homepages of the common superior", at this time, the user in the organization beyond the homepage visibility setting range of the "A Person" cannot view the homepage information of the "A Person" in any form, and the homepage information related to "A Person" cannot be matched during the search. However, if the homepage visibility of "A Person" is modified to "visible to all homepages in the organization" or "public", the visitor B Person in the organization can view the homepage of the "A Person" after searching.

(d) For the communication mode visibility setting, whether the visitor has the authority to view the identification number of any homepage in the homepage system or start an audio/video IP call function of the homepage in an IP call contact list depends on the contact information visibility setting range of the homepage, and if the contact information visibility of the homepage is set as public, the visitor can view the identification number of the homepage and make audio and video IP calls. As an implementation, assuming that the contact information visibility of the homepage corresponding to the "A Person" is set as "visible to partial homepages in the major work system, then the homepage of the A person is visible to all superior homepages in the connected root homepage path and peer homepages of the common superior".

It should be noted here that taking the homepage of the organization as an example, the homepage visibility, contact information visibility, Gcall instant messenger visibility and Gcall mail visibility of the organization and all levels of homepages below the organization can be set independently. However, when the visible range of the "contact information visibility" is wider than the "Gcall instant messenger visibility" and the "Gcall mail visibility", the "Gcall instant messenger visibility" and the "Gcall mail visibility" can be modified to be consistent with the visible range of the "contact information visibility".

(e) For the information push authority setting, a subordinate homepage of a homepage and all homepages therebelow are default followers of the homepage, that is, regardless of whether the follower is within the homepage cluster, the post push default range is a set of all the followers, and the post push implementation range is the intersection of the default range and the post visibility setting range.

Figure 10:
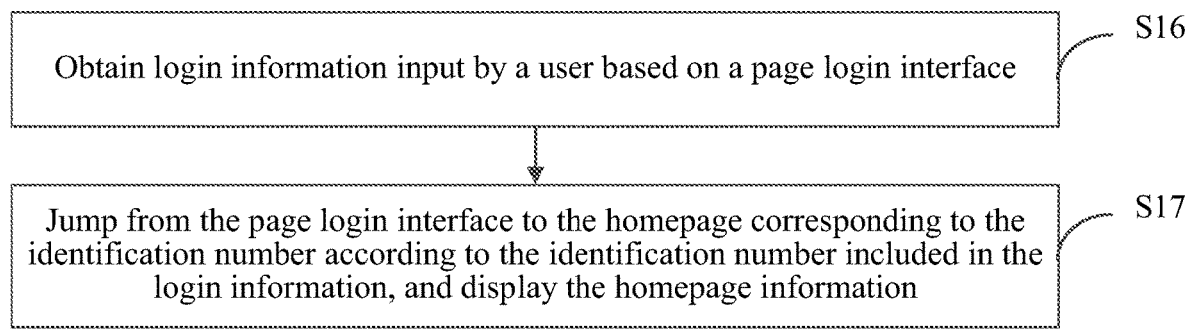
FIG. 10 is a flow diagram of a homepage management method according to another embodiment of the present invention.

Further, in addition to performing the homepage management operation based on the above-mentioned identification number, in the present embodiment, the homepages in the tree-type homepage system may also implement collection-type homepage communication based on the identification number, such as instant messaging, audio/video IP call, E-Mail or the like. Specifically, as shown in FIG. 10, the present embodiment can be illustrated in conjunction with the following steps S16 to S17.

Step S16: responding to a homepage communication instruction, the homepage communication instruction including one or more of an instant communication instruction, an audio and video call instruction, a mail sending and receiving instruction and an information release instruction; and Step S17: establishing a communication link between the homepage corresponding to the identification number and the current homepage based on the identification number included in the homepage communication instruction to implement communication therebetween.

Specifically, in step S16 and step S17, the tree-type homepage system integrates a social network that pushes posts for the user through the homepage and realizes multi-dimensional display, and an inter-user communication function. Wherein, each homepage in the tree-type homepage system has a corresponding identification number and each homepage corresponds to a person or an organization branch in the organization, and therefore, in the present embodiment, the homepages may implement, based on the identification number, communication, such as one or more of an audio/video call instruction, a mail sending and receiving instruction and an information release instruction. In actual implementation, the authority of the audio/video IP call can be prior to the IM (instant messaging) and E-Mail, and the instant messaging software and E-Mail have the same independent priority. For example, if a homepage obtains IP call authority to connect to other homepages, it automatically gains the authority of access to IM and E-Mail of the same homepage.

According to actual needs, if the above identification number is composed of a 12-digit number, then for an organization with a total of no more than 10000 branches and persons, the communication, such as audio/video IP call, can be implemented by only dialing the last 4 digits in the 12-digit identification number.

Further, based on the description of the homepage management method, the embodiment of the present invention further provides a homepage management apparatus 100 applied to a homepage management platform 10. The homepage management apparatus 100 includes an instruction responding module, a number determination module and a homepage operation module.

The instruction responding module is configured to respond to a homepage management instruction based on any homepage in the tree-type homepage system;

The number determination module is configured to determine an identification number of the current homepage according to the homepage management instruction, and determine identification numbers of all the subordinate homepages of the current homepage according to the identification number of the current homepage; and The homepage operation module is configured to execute a management operation corresponding to the homepage management instruction on the current homepage and the subordinate homepages corresponding to the current homepage based on the identification number of the current homepage and the identification numbers of all the subordinate homepages of the current homepage.

It should be noted that for a detailed description of the instruction responding module, the number determination module and the homepage operation module, reference may be made to the foregoing detailed description of step S11 to step S13, and details are not repeated herein.

In one aspect, the invention also provides a non-transitory computer-readable storage medium storing programs and/or instruction codes. The programs and/or instruction codes, when executed by one or more processors, cause the above homepage management methods to be performed.

In sum, the present invention provides a tree-type homepage system and a homepage management method, wherein the connection relationship between the homepages in the tree-type homepage system provided by the present invention corresponds to the existing organization internal relationship or administrative management relationship, and the homepage management method provided by the present invention implements the management operation on the tree-type homepage system based on identification numbers, so that the homepage information of the managed organization branches or personnel can be quickly located; and thus, the management efficiency on the organization internal personnel or organization branches can be greatly improved, and the management process is more convenient, precise and human-based.

It should be appreciated that the disclosed apparatus and method may also be implemented in other manners. The embodiments of the apparatus and method described above are merely illustrative, but are not intended to limit the invention. For example, the flow diagrams and block diagrams in the drawings illustrate the architecture, functionality and operation of possible implementations of systems, methods and computer program products according to the multiple embodiments of the present invention. In this regard, each block of the flow diagram or block diagram may represent a module, a program segment, or a portion of a code that includes one or more executable instructions for implementing the specified logical functions. It should also be noted that in some alternative implementations, the functions noted in the blocks may also occur in a different order from the one illustrated in the drawings. For example, two consecutive blocks may be executed substantially in parallel, and they may sometimes be executed in the reverse order, depending upon the function involved. It should also be noted that each block of the block diagram and/or flow diagram, and a combination of blocks in the block diagram and/or flow diagram, may be implemented in a special hardware-based system that performs the specified function or action, or may be implemented by a combination of special hardware and computer instructions.

In addition, the functional modules in the embodiments of the present invention can be integrated together to form an independent part, or each functional module can exist alone, or two or more modules can be integrated to form an independent part.

When the function is implemented in the form of a software functional module and sold or used as an independent product, the function may be stored in a computer-readable storage medium. Based on such an understanding, the technical solution of the present invention essentially, or the part contributing to the prior art, or all or some of the technical solution may be embodied in the form of a software product. The computer software product is stored in a storage medium and includes several instructions for instructing a computer device (which may be a personal computer, an electronic device 10, a network device, or the like) to perform all or some of the steps of the methods described in the embodiments of the present invention. The foregoing storage medium includes: various media that can store program code, such as a USB flash disk, a mobile hard disk drive, a read-only memory (ROM), a random access memory (RAM), a magnetic disk, or an optical disc.

The foregoing descriptions are merely preferred embodiments of the present invention, but are not intended to limit the present disclosure. For a person skilled in the art, the present invention can have various modifications and changes. Any modification, equivalent replacement, or improvement made within the spirit and principle of the present disclosure shall fall within the protection scope of the present invention.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the invention pertains without departing from its spirit and scope. Accordingly, the scope of the invention is defined by the appended claims rather than the foregoing description and the exemplary embodiments described therein.

What is claimed is:

1. A tree-type homepage system, comprising:
   a processor; and
   a homepage management apparatus comprising a storage device storing computer programs and a plurality of homepages related to an organization having a plurality of users and a plurality of organization branches, wherein each homepage represents one of the users or one of the organization branches of the organization, the homepages are connected according to an internal administrative management relationship or personnel internal relationship between the users and the organization branches of the organization,
   wherein the homepages comprises at least one superior homepage having one or more subordinate homepages according to the internal administrative management relationship or the personnel internal relationship, each superior homepage has corresponding management operation authorities to the superior homepage itself and the one or more subordinate homepages belonging thereto, and a top-level homepage of the at least one superior homepage is defined as a root homepage being having the corresponding management operation authority to all of the homepages,
   wherein each homepage owns at least one of a plurality of identification numbers with a preset length, the preset length of each of all of the identification numbers of the homepages is identical, each identification number is used to identify a corresponding homepage representing one of the users or one of the branches of the organization, a quantity of all of the homepages is not greater than a value of the identification number identifying the root homepage, and the identification number identifying each of the at least one superior homepage is the smallest number of all the identification numbers owned by the at least one superior homepage,
   wherein the computer programs, when executed by the processor, is configured to perform steps comprising:
      providing a page login interface;
      obtaining, through the page login interface, a login information input by a specific user of the users, wherein the specific user is represented by a specific homepage of the homepages, the specific homepage is identified by a specific identification number of the identification numbers, and the login information includes the specific identification number;
      displaying the specific homepage being identified by the specific identification number included in the login information in the and corresponding homepage information, wherein the specific homepage is defined as a current homepage;
      responding to a homepage management instruction based on the current page, wherein the homepage management instruction corresponds to a management operation on at least one of the current homepage, the subordinate homepages belonging to the current homepage, and a target homepage; and
      executing the management operation corresponding to the homepage management instruction.

2. The tree-type homepage system according to claim 1, wherein each of the at least one superior homepage owns a quantity M of the identification numbers, wherein M is a positive integer, and each of the at least one superior homepage has at most (M−1) subordinate homepages.

3. The tree-type homepage system according to claim 1, wherein the management operation comprises a homepage movement, a homepage association, a homepage deletion, a homepage creation, a homepage authority setting, or a combination thereof.

4. The tree-type homepage system according to claim 3, wherein the management operation is the homepage movement, the target homepage is a target movement homepage, and the step of executing the management operation corresponding to the homepage management instruction comprises:
obtaining, from the homepage management instruction, an identification number of the target movement homepage;
moving at least one of the current homepage and the subordinate homepages corresponding to the current homepage to the target movement homepage as subordinate homepages of the target movement homepage based on the identification number of the current homepage and the identification numbers of all the subordinate homepages of the current homepage; and
assigning a new identification number to each of the at least one of the current homepage and the subordinate homepages corresponding to the current homepage being moved according to the identification number of the target movement homepage.

5. The tree-type homepage system according to claim 3, wherein the management operation is the homepage association, the target homepage is a target association homepage, and the step of executing the management operation corresponding to the homepage management instruction comprises:
obtaining an identification number of the target association homepage; and
associating the subordinate homepages corresponding to the current homepage to the target association homepage based on the identification number of the current homepage and the identification numbers of all the subordinate homepages of the current homepage such that the current homepage and the target association homepage are used as common superior homepages of the subordinate homepages.

6. The tree-type homepage system according to claim 5, wherein the target association homepage, as one of the common superior homepages of the subordinate homepages, does not have all of the corresponding management operation authorities to the subordinate homepages.

7. The tree-type homepage system according to claim 3, wherein the management operation is the homepage authority setting, and the step of executing the management operation corresponding to the homepage management instruction comprises:
identifying an authority setting type in a homepage authority setting instruction;
selecting a target identification number that meets the requirement according to the authority setting information and the identification number of the current homepage; and
performing authority association on the target homepage corresponding to the target identification number and the current homepage.

8. The tree-type homepage system according to claim 3, wherein the management operation is the homepage creation, and the step of executing the management operation corresponding to the homepage management instruction comprises:
responding to an identification number assignment type, wherein the assignment type is selected from a group consisting of a manual assignment and a system assignment;
when the assignment type is the manual assignment, creating a newly created subordinate homepage of the current homepage based on the current homepage, assigning an identification number segment input by the specific user based on the plurality of identification numbers owned by the current homepage to the newly created homepage, and using the smallest number in the identification number segment as the identification number of the newly created subordinate homepage, wherein the newly created subordinate homepage also owns the one or more of the plurality of identification numbers included in the indentification number segment; and
when the assignment type is the system assignment, creating the newly created subordinate homepage of the current homepage based on the current homepage, and randomly assigning an identification number from the plurality of identification numbers owned by the current homepage as the identification number of the newly created subordinate homepage, wherein the newly created subordinate homepage owns only the identification number being randomly assigned thereto.

9. The tree-type homepage system according to claim 8, wherein the assignment type is the manual assignment, the identification number segment includes a plurality of the identification numbers owned by the current homepage, and the newly create subordinate homepage has the corresponding management operation authority to be a superior homepage to another homepage.

10. The tree-type homepage system according to claim 1, wherein the computer programs, when executed by the processor, is further configured to perform steps comprising:
responding to a homepage communication instruction including an identification number identifying a target homepage to be communicated with the current homepage, the homepage communication instruction including an instant communication instruction, an audio and video call instruction, a mail sending and receiving instruction, an information release instruction, or a combination thereof; and
establishing a communication link between the target homepage corresponding to the identification number and the current homepage based on the identification number included in the homepage communication instruction so as to implement communication therebetween.

11. A homepage management method for managing having a plurality of homepages related to an organization having a plurality of users and a plurality of organization branches, each homepage representing one of the users or one of the organization branches of the organization, the homepages being connected according to an internal administrative management relationship or personnel internal relationship between the users and the organization branches of the organization, comprising:
providing a page login interface for the organization, wherein the homepages related to the organization comprises at least one superior homepage having one or more subordinate homepages according to the internal administrative management relationship or the personnel internal relationship, each superior homepage has a corresponding management operation authority to the superior homepage itself and the one or more subordinate homepages belonging thereto, a top-level homepage of the at least one superior homepage is defined as a root homepage being having the corresponding management operation authority to all of the homepages, each homepage owns at least one of a plurality of identification numbers with a preset length, the preset length of each of all of the identification numbers of the homepages is identical, each identification number is used to identify a corresponding homepage representing one of the users or one of the branches of the organization, a quantity of all of the homepages is not greater than a value of the identification number identifying the root homepage, and the identification number identifying each of the at least one superior homepage is the smallest number of all the identification numbers owned by the at least one superior homepage;

obtaining, through the page login interface, a login information input by a specific user of the users of the organization, wherein the specific user is represented by a specific homepage of the homepages, the specific homepage is identified by a specific identification number of the identification numbers, and the login information includes the specific identification number;

displaying the specific homepage being identified by the specific identification number included in the login information in the and corresponding homepage information, wherein the specific homepage is defined as a current homepage;

responding to a homepage management instruction based on system the current page, wherein the homepage management instruction corresponds to a management operation on at least one of the current homepage, the subordinate homepages belonging to the current homepage, and a target homepage; and executing the management operation corresponding to the homepage management instruction.

12. The homepage management method according to claim 11, wherein the management operation comprises a homepage movement, a homepage association, a homepage deletion, a homepage creation, a homepage authority setting, or a combination thereof.

13. The homepage management method according to claim 12, wherein the management operation is the homepage movement, the target homepage is a target movement homepage, and the step of executing the management operation corresponding to the homepage management instruction comprises:

obtaining an identification number of the target movement homepage;

moving at least one of the current homepage and the subordinate homepages corresponding to the current homepage to the target movement homepage as subordinate homepages of the target movement homepage based on the identification number of the current homepage and the identification numbers of all the subordinate homepages of the current homepage; and assigning a new identification number to each of the at least one of the current homepage and the subordinate homepages corresponding to the current homepage being moved according to the identification number of the target movement homepage.

14. The homepage management method according to claim 12, wherein the homepage management operation is the homepage association, the target homepage is a target association homepage, and the step of executing the management operation corresponding to the homepage management instruction includes:

obtaining an identification number of the target association homepage; and associating the subordinate homepages corresponding to the current homepage to the target association homepage based on the identification number of the current homepage and the identification numbers of all the subordinate homepages of the current homepage such that the current homepage and the target association homepage are used as common superior homepages of the subordinate homepages.

15. The homepage management method according to claim 12, wherein the management operation is the homepage authority setting, the step of executing the management operation corresponding to the homepage management instruction includes:

identifying an authority setting type in a homepage authority setting instruction;

selecting a target identification number that meets the requirement according to the authority setting information and the identification number of the current homepage; and performing authority association on the target homepage corresponding to the target identification number and the current homepage.

16. The homepage management method according to claim 12, wherein the homepage management operation is the homepage creation, the step of executing the management operation corresponding to the homepage management instruction includes:

responding to an identification number assignment type, wherein the assignment type is selected from a group consisting of a manual assignment and a system assignment;

when the assignment type is the manual assignment, creating a newly created subordinate homepage of the current homepage based on the current homepage, assigning an identification number segment input by the specific user based on the plurality of identification numbers owned by the current homepage to the newly created homepage, and using the smallest number in the identification number segment as the identification number of the newly created subordinate homepage, wherein the newly created subordinate homepage also owns the one or more of the plurality of identification numbers included in the indentification number segment; and when the assignment type is the system assignment, creating the newly created subordinate homepage of the current homepage based on the current homepage, and randomly assigning an identification number from the plurality of identification numbers owned by the current homepage as the identification number of the newly created subordinate homepage, wherein the newly created subordinate homepage owns only the identification number being randomly assigned thereto.

17. The homepage management method according to claim 11, further comprising:

responding to a homepage communication instruction including an identification number identifying a target homepage to be communicated with the current homepage, the homepage communication instruction including an instant communication instruction, an audio and video call instruction, a mail sending and receiving instruction, an information release instruction, or a combination thereof; and establishing a communication link between the target homepage corresponding to the identification number and the current homepage based on the identification number included in the homepage communication instruction so as to implement communication therebetween.

18. A non-transitory computer-readable medium storing programs which, when executed by one or more processors, cause the homepage management method of claim 11 to be performed.

19. The homepage management method according to claim 11, wherein each of the at least one superior homepage owns a quantity M of the identification numbers, wherein M is a positive integer, and each of the at least one superior homepage has at most (M−1) subordinate homepages.

20. The homepage management method according to claim 14, wherein the target association homepage, as one of the common superior homepages of the subordinate homepages, does not have all of the corresponding management operation authorities to the subordinate homepages.

* * * * *